United States Patent

[15] 3,644,818

Paget

[45] Feb. 22, 1972

[54] ELECTRONIC FLASHLAMP POWER SUPPLY

[72] Inventor: Fredrick W. Paget, Hamilton, Mass.
[73] Assignee: GTE Sylvania Incorporated
[22] Filed: Mar. 10, 1971
[21] Appl. No.: 122,793

[52] U.S. Cl. .................... 321/18, 315/209 CD, 315/241 S, 315/241 P
[51] Int. Cl. ........................................ H02m 1/08
[58] Field of Search .............. 321/2, 18; 315/209 CD, 241 S, 315/241 P, DIG. 5

[56] References Cited

UNITED STATES PATENTS

| | | | |
|---|---|---|---|
| 2,946,924 | 7/1960 | Gerlach et al. | 315/241 S |
| 3,154,732 | 10/1964 | Jensen | 315/241 S |
| 3,213,344 | 10/1965 | Jensen | 315/241 P |
| 3,229,158 | 1/1966 | Jensen | 315/100 S |
| 3,248,605 | 4/1966 | Tomkinson | 315/241 P |
| 3,310,723 | 3/1967 | Schmidt et al. | 321/2 X |
| 3,532,961 | 10/1970 | Bramer | 321/18 |

*Primary Examiner*—William M. Shoop, Jr.
*Attorney*—Norman J. O'Malley, Edward J. Coleman and Joseph C. Ryan

[57] ABSTRACT

A flash system power supply for charging a storage capacitor employed in operating a flashlamp. A battery-powered multivibrator-type converter is coupled to the storage capacitor through a transformer-rectifier circuit, with the multivibrator being triggered into oscillation by a start circuit comprising a relaxation oscillator. Multivibrator operation is squelched by a negative voltage pulse from a stop circuit controlled by a relaxation oscillator-type voltage detector which senses a predetermined charge on the storage capacitor. The stop circuit is also controlled by a current-sensing resistor which detects discharge of the storage capacitor. Operation of the start circuit is clamped to the stop circuit through a diode, with the stop circuit having a time constant sufficient to delay restarting of the multivibrator beyond the deionization period of the flashlamp.

12 Claims, 2 Drawing Figures

FIG.2

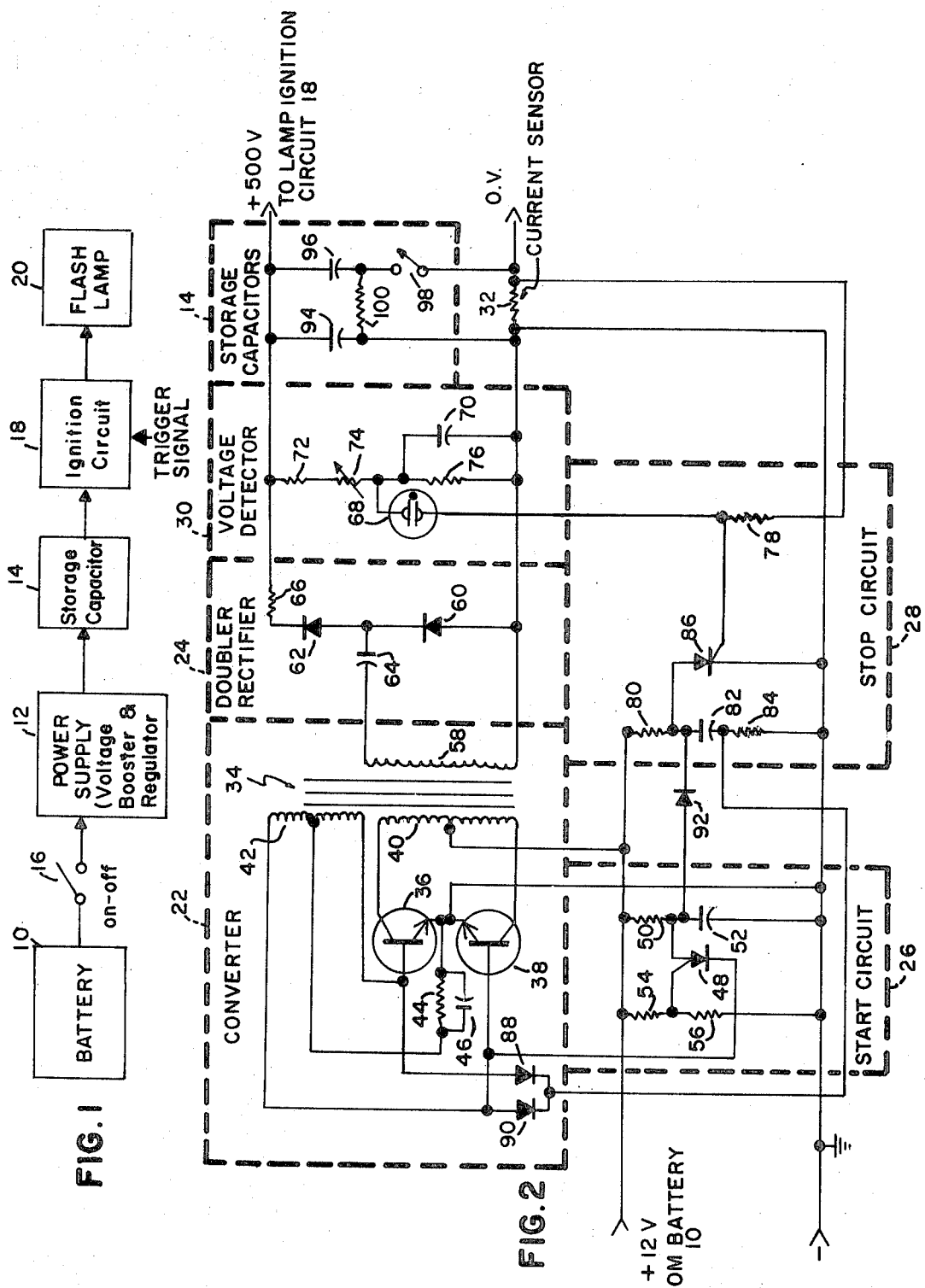

ELECTRONIC FLASHLAMP POWER SUPPLY

BACKGROUND OF THE INVENTION

This invention relates generally to flash systems and, more particularly, to an improved power supply for rapidly charging the storage capacitor employed in operating a flashlamp.

Flashlamps are generally powered by a relatively high-voltage storage capacitor that discharges through the lamp, and the capacitor is charged by either a high-voltage, multicell battery of a lower voltage battery with a power converter and control circuit to regulate the charge. The converter circuit generally comprises an oscillator, a transformer and a rectifier for developing the higher voltage to charge the storage capacitor. Regulation of the charge cycle is normally provided by a relay. When the flashed system is turned on, the oscillator is forward biased through the closed relay contacts to commence oscillation under the power of the battery. The storage capacitor is then charged to a predetermined level, whereupon a threshold voltage detector actuates the relay to switch off the forward bias and thereby squelch the oscillator. For example, a prior art flash system of this type is described in U.S. Pat. No. 3,532,961.

Although relay-controlled flash systems are generally satisfactory for a number of applications, operational reliability can be significantly improved and package size and weight can be reduced by eliminating the relay and employing electronic control circuitry. Conventional electronic switching circuits, however, may not provide the desired efficiency and complete squelching required for optimum power supply operation. Further, other than the provision for oscillator squelching upon charging the storage capacitor to the desired voltage level, prior flash systems provide no means for preventing lamp "hang-up" during and immediately after flashing. More specifically, when a xenon lamp is flashed, a period of deionization follows before the voltage holdoff capabilities of the lamp are restored. If the lamp is flashed at a time when the converter is oscillating, or if the converter starts immediately after the flash and during the deionization period, the charging voltage generated by the converter may cause the lamp to go into steady conduction in a glow or arc discharge, thereby preventing the storage capacitor from being charged. As a consequence, the lamp will not operate on the next strobe trigger signal. Accordingly, to assure proper operation the storage capacitor voltage should be keep below a certain threshold during the critical deionization period.

SUMMARY OF THE INVENTION

Accordingly, it is an object of the present invention to provide an improved flash system power supply.

It is another object of the invention to provide an efficient and reliable electronic power supply for rapidly charging the storage capacitor employed in operating a flashlamp.

It is a further object of the invention to provide an electronic flashlamp power supply in which the voltage-generating means is automatically disabled during the deionization period of the flashlamp.

Briefly, these objects are attained by providing a flash system power supply in which the converter, or other AC voltage-generating means, is automatically controlled with respect to both starting and stopping by interconnected discharge circuits responsive to improved voltage detection and current-sensing means. More specifically, the power supply includes a start circuit comprising a relaxation oscillator operative to generate a trigger pulse for initiating converter oscillation. A voltage detector of the relaxation oscillator type senses the charge level on the storage capacitor, and a stop circuit, comprising a capacitor and resistor circuit with controlled switch in the discharge path, is responsive to a signal from the voltage detector to generate a pulse having a polarity operative to disable converter oscillation. The start circuit is clamped through a diode to the stop circuit whereby operation of the start circuit is dependent upon the time constant of the stop circuit and is rendered inoperative when the stop circuit is in the discharged state. The power supply further includes a current-sensing resistor for detecting discharge of the flashlamp storage capacitor and triggering the stop circuit to disable the converter in response thereto. Restarting of the converter is then delayed for a period longer than that required for deionization of the flashlamp by virtue of the RC time constant selected for the stop circuit. Accordingly, when the flashlamp is ignited in response to discharge of its storage capacitor, a stop signal is generated which prevents the converter from starting or, if running, stops it immediately.

BRIEF DESCRIPTION OF THE DRAWINGS

This invention will be more fully described hereinafter in conjunction with the accompanying drawings, in which:

FIG. 1 is a simplified block diagram of a flash system in which a power supply according to the invention may be employed; and FIG. 2 is a schematic diagram of one preferred embodiment of a power supply according to the invention.

DESCRIPTION OF PREFERRED EMBODIMENT

Referring to FIG. 1, a typical flash system comprises a battery 10, a power supply 12 for boosting the battery voltage and regulating its application to charge one or more storage capacitors 14. The system is turned on to energize power supply 12 and thus commence the charging of capacitor 14 by means of an on-off switch 16 connected between the battery 10 and the power supply. An ignition circuit 18 is responsive to an applied trigger signal to discharge the stored energy in capacitor 14 for producing a flash from lamp 20. The source of the trigger signal applied to the ignition circuit is dependent upon the application, e.g., in photography, the trigger signal is obtained from the camera shutter contacts, whereas in strobe light applications, such as providing illumination for a computer printout, a system clock may apply pulses at predetermined intervals. Flashlamp 20 typically comprises an arc discharge lamp filled with an ionizable gas such as xenon.

The components of a typical flash system are generally well known in the art, however, in accordance with the present invention an improved circuit is provided for power supply 12, as illustrated in FIG. 2. The functional elements of the power supply comprise a converter 22 and voltage doubler-rectifier 24 for boosting the battery voltage from, for example, 12 volts DC to 500 volts DC for charging the storage capacitors 24. Converter 22 is triggered into oscillation by a start circuit 26 and squelched by a stop circuit 28, which is responsive to control signals from a voltage detector 30 and a current-sensing resistor 32.

Although a variety of circuit implementations are suitable for use as converter 22, the embodiment of FIG. 2 employs a Royer magnetic multivibrator in combination with a ferrite core transformer 34. The multivibrator includes a pair of power transistors 36 and 38 having collector electrodes connected at opposite ends of primary winding 40, the center tap which is connected to the positive terminal of battery 10. The transistor emitter electrodes are connected to opposite ends of a primary winding 42, the center tap of which is connected to ground through a drive control resistor 44, bypassed by capacitor 46. The multivibrator has no starting bias and thus will not start oscillating until triggered into operation by a forward biasing pulse applied to one of its base electrodes. Once oscillation is commenced, the converter runs unaided due to the energy storage in transformer 34. Typically, the multivibrator operates at about 5 to 10 kHz.

Start circuit 26 is a relaxation oscillator employing a PNPN-anode gate thyristor 48, known as a programmable unijunction transistor (PUT). An associated RC charging circuit comprises resistor 50 and capacitor 52 serially connected across the output of battery 10. The main anode of thyristor 48 is connected to the junction of resistor 50 and capacitor 52, and the cathode of the thyristor is connected directly to the base of multivibrator transistor 38. The gate control anode of thyristor 48 is connected to a voltage divider comprising resistors 54 and 56, which program the threshold voltage at which the thyristor will turn on and be fully conducting. Thus, if the divider network established a threshold of 8 volts, for example then when the charge on capacitor 52 reaches 8 volts, thyristor 48 will switch to the conducting state and thereby rapidly discharge capacitor 52. As a result, a pulse will be generated in the cathode circuit of thyristor 48 which has a polarity (positive in this case) such that when applied to the base of transistor 38, that transistor will be driven into conduction and thus commence oscillation of the multivibrator converter.

The AC voltage generated by the converter is transformed to high voltage, then doubled and rectified for application to the storage capacitors 14 by the circuit 24 connected to the secondary winding 58 of transformer 34. More specifically, the doubler-rectifier comprises a pair of diodes 60 and 62 serially connected across the storage capacitors 14, and a capacitor 64 connected between the junction of the diodes and one terminal of secondary winding 58. The other terminal of the secondary winding is connected with the cathode of diode 60 to ground. A resistor 66 is serially connected between the cathode of diode 62 and the storage capacitors to limit the peak current in the rectifier when the storage capacitors are being charged. This type of a rectifier has a falling output current with load, so that it acts as a current-limiting circuit to prevent large overloads or short circuit loads from appearing at the converter. Accordingly, circuit 24 is ideal for a capacitor charging rectifier where, as in this case, the uncharged capacitor initially appears as a short circuit.

Voltage detector 30 is a relaxation oscillator comprising a neon lamp 68 of the stabilized radio isotope type, a charge capacitor 70 and a voltage divider comprising resistors 72, 74 and 76 serially connected across the storage capacitors 14. One terminal of the neon lamp is connected to the junction of resistors 74 and 76, while the other terminal is connected to the stop circuit, as will be described hereinafter. As shown, resistor 76 is connected between the neon lamp and ground, and capacitor 70 is connected across resistor 76.

In operation, the voltage detection circuit senses the voltage charge on storage capacitors 14 and generates a threshold signal when that charge reaches a predetermined level. More specifically, when the voltage of storage capacitors 14 reaches the point where the neon lamp 68 discharges, the resulting discharge of capacitor 70 through the neon lamp developes a pulse across a resistor 78 in the stop circuit which functions as a threshold signal for actuating the stop circuit to squelch operation of the multivibrator-converter. Hence, the breakdown characteristics of neon lamp 68 and the values selected for the divider network 72–76 determine the maximum charge level for the storage capacitors and the point at which a voltage detector signal will be transmitted to prevent the further generation of a charging voltage. The threshold signal pulses produced by the voltage detector are repeated as long as the voltage on the storage capacitors 14 is high enough to cause discharge of lamp 68.

Stop circuit 28 includes a charging resistor 80, a capacitor 82, and a discharge path resistor 84 serially connected in that order between the positive and negative output lines from battery 10. The circuit further includes a silicon controlled rectifier (SCR) 86 having an anode electrode connected to the junction of resistor 80 and capacitor 82, a cathode connected to ground, and a gate electrode connected through resistor 78 and the current-sensing resistor 32 to ground. The output terminal of lamp 68 is thus connected to the junction of resistor 78 and the gate electrode of the silicon-controlled rectifier (SCR) 86. The junction of capacitor 82 and resistor 84 is connected to the base electrodes of multivibrator transistors 36 and 38 through isolating diodes 88 and 90 respectively.

In operation, the system of FIG. 1 is turned on to start the charging of storage capacitor 14 by closing switch 16. Battery 10 is thereby connected to charge the start circuit capacitor 52 through resistor 50 and also to charge the stop circuit capacitor 82 through resistor 80. However, a diode 92 interconnects the start and stop circuits with its anode being connected to the junction of resistor 50 and capacitor 52 and its cathode connected to the junction of resistor 80 and capacitor 82. Diode 92 thereby clamps capacitor 52 to capacitor 82 whereby the charge on the start circuit capacitor is prevented from exceeding the charge on the stop circuit capacitor. The battery will continue to charge capacitors 52 and 82 via switch 16 until the threshold voltage of thyristor 48 is reached. At that point, thyristor 48 is switched into the conducting state and thereby discharges capacitor 52 to provide a forward biasing pulse for triggering the multivibrator into oscillation. When detector 30 senses that the storage capacitors 14 have been charged to the maximum level, neon lamp 68 discharges, thereby discharging capacitor 70 to produce a pulse across resistor 78 which gates SCR 86 into conduction. The conducting SCR 86 causes capacitor 82 to be discharged backwards through resistor 84 so that a negative pulse is coupled via diodes 88 and 90 to the bases of transistors 36 and 38. The negative reverse biasing pulse is of sufficient magnitude and duration, e.g., 5.5 amperes for 100 milliseconds, to turn off transistors 36 and 38 long enough for the stored energy in the transformer 34 to dissipate so that the multivibrator stops oscillating. Once squelched, the multivibrator will not again commence oscillation until triggered by the start circuit. Further, discharge of capacitor 82 causes the capacitor 52 of the start circuit to be drained through the clamping diode 92 so that no start pulse will be generated as long as voltage detector 30 continues to apply pulses to stop circuit 28.

As leakage causes the voltage on the storage capacitors 14 to decay, voltage detector 30 will stop oscillating and allow the voltage on capacitor 82 to build up by charging. As the voltage on the stop circuit capacitor increases, the clamping diode connection will also permit the voltage on capacitor 52 to build up until a start pulse is generated. The converter will then again commence oscillation and operate for a short burst until the maximum charge is restored on capacitors 14 and a stop pulse is again delivered. In the periods between converter bursts, the power supply draws a relatively small amount of current from the battery.

The typical energy storage circuit in a flash system normally employs two or more storage capacitors to provide different levels of flashlamp intensity. Accordingly, circuit 14 is illustrated as including two storage capacitors one of which, capacitor 94, is connected directly across the doubler-rectifier output, with the second, capacitor 96, being connected across the rectifier through a switch 98. Switch 98 is serially connected on the low side of capacitor 96, and a resistor 100 is connected between the low side terminals of capacitors 94 and 96. When switch 98 is open, resistor 100 causes capacitor 96 to charge at a much slower rate than capacitor 94; thus, when the converter is stopped, a lower level of stored energy is made available for lamp flashing, with resistor 100 isolating the flashlamp from capacitor 96. When switch 98 is closed, capacitors 94 and 96 both charge in the same rapid manner, such that when the converter is stopped a higher level of stored energy is made available for the flashlamp.

Stop circuit 28 is also controlled by the current-sensing resistor 32 which is connected in the ground line between the low side terminals of capacitor 94 and switch 98, as shown. This arrangement also places the current-sensing resistor 32 between the low side terminal of the stop circuit resistor 78 and ground. The value of resistor 32 is very low, typically 0.005 ohm; in fact, the current-sensing resistor actually comprises a piece of wire. The purpose of resistor 32 is to sense the discharge of capacitor 94, which occurs when lamp 20 is flashed, and in response thereto apply a control signal to trigger the stop circuit to squelch converter 22 for a period long enough to permit complete deionization of flashlamp 20. More specifically, when a trigger signal is applied to ignition circuit 18, the storage capacitor circuit 14 will be discharged to operate flashlamp 20. More particularly, at least capacitor 94 will be discharged. The resulting flash discharge current produces a voltage drop across resistor 32, which also appears as a trigger signal across the gate and cathode of SCR 86. Once triggered, SCR 86 conducts to discharge capacitor 82 and thereby transmit a negative stop pulse to squelch the operation of the multivibrator-converter. The converter will not restart until the time constant of the RC charge circuit comprising resistor 80 and capacitor 82 allows the voltage on capacitor 52, as controlled via clamping diode 92, to rise to the threshold level of thyristor 48. Accordingly, the RC charging time constant of resistor 80 and capacitor 82 is selected to delay the starting of the multivibrator beyond the deionization period of flashlamp 20. Thus, flashing of lamp 20 produces a stop signal which prevents the converter 22 from starting or, if running, stops it immediately for a period sufficient to prevent application of a charging voltage to the storage capacitor circuit 14 during the deionization period of lamp 20. In this manner, the power supply prevents flashlamp "hang-up," a feature of particular advantage in strobe light applications.

In summary, the present invention provides an electronically controlled power supply for a flash system which employs a pair of mutually dependent discharge circuits for positively starting and stopping the converter with pulse signals. The use of a relaxation oscillator type voltage detector in combination with the stop circuit provides efficient low-power operation and eliminates the need for a relay. Further, the start-and-stop circuit operation in combination with the current sensor provides efficient means for preventing application of voltage to the flashlamp during its deionization period after a flash and thus prevents lamp "hang-up."

Although a preferred embodiment of the invention has been shown and described, it is to be understood that a number of alternative implementations are contemplated. For example, the invention is not limited to use with battery-powered converters; the voltage detector, current sensor, and start-and-stop circuit combination may also be employed to control other forms of AC voltage-generating means, such as an AC line voltage source having a transformer-bridge rectifier operated by one or more gate-controlled switches. Voltage detector 30 may take a variety of forms, and other switching devices may be used in lieu of neon lamp 68. A variety of discharge circuit embodiments are suitable for implementing the start-and-stop circuits; a number of alternative gate-controlled devices may be used in lieu of SCR 86; and alternative threshold devices are available for use in lieu of thyristor 48. A variety of converter circuit arrangements are available, and start-and-stop control may be effected other than by pulses applied to transistor base electrodes, for example the start circuit could apply a pulse to an additional primary winding of the converter to initiate oscillation.

What I claim is:

1. For use in a flash system having ignition means for operating a flashlamp in response to discharge of a first capacitor, a power supply for charging said first capacitor comprising:
    means for generating an AC voltage;
    means including a rectifier for coupling said voltage-generating means across said first capacitor;
    first discharge means including a second capacitor for starting said voltage-generating means;
    voltage detection means for sensing the voltage charge on said first capacitor and generating a threshold signal when the charge on said first capacitor reaches a predetermined level;
    second discharge means including a third capacitor for applying a stop signal to disable said voltage-generating means in response to a threshold signal from said voltage detection means; and
    means including a diode for clamping said second capacitor to said third capacitor.

2. A power supply according to claim 1 further including means for sensing discharge of said first capacitor and triggering said second discharge means to disable said voltage-generating means in response thereto.

3. A power supply according to claim 1 wherein said first discharge means further includes means for generating a pulse in response to said second capacitor being charged to a predetermined voltage level, said pulse being applied to start said voltage-generating means.

4. A power supply according to claim 3 wherein said first discharge means comprises a relaxation oscillator.

5. A power supply according to claim 1 wherein said second discharge means further includes controlled switching means for discharging said third capacitor in response to a threshold signal from said voltage detection means, and means for coupling a pulse produced by discharge of said third capacitor to said voltage-generating means, said pulse comprising said stop signal and having a polarity operative to disable said voltage-generating means, and discharge of said third capacitor causing any charge on said second capacitor to be drained through said diode clamping means.

6. A power supply according to claim 1 wherein said voltage detection means comprises a relaxation oscillator.

7. A power supply according to claim 1 wherein said means for generating an AC voltage comprises a battery-powered converter circuit, said first discharge means is operative to start oscillation of said converter circuit, and the stop signal from said second discharge means is operative to squelch oscillation of said converter circuit.

8. A power supply according to claim 7 wherein said converter circuit includes a transformer having primary and secondary windings and a multivibrator connected to said primary windings, said rectifier coupling means being connected between the secondary winding of said transformer and said first capacitor.

9. A power supply according to claim 8 further including means for charging said second and third capacitors, said diode clamping means preventing the charge on said second capacitor from exceeding the charge on said third capacitor, and wherein said second discharge means includes an RC charge circuit comprising a first resistor and said third capacitor, gate-controlled switch connected for discharging said third capacitor in response to a control signal, and means for coupling said third capacitor to said multivibrator whereby discharge of said third capacitor is operative to apply a reverse biasing pulse of sufficient magnitude and duration to stop oscillation of said multivibrator.

10. A power supply according to claim 9 wherein said first discharge means is a relaxation oscillator comprising an RC charge circuit including a second resistor and said second capacitor, threshold switching means for discharging said second capacitor in response to said second capacitor being charged to a predetermined voltage level, and means for coupling said threshold switching means to said multivibrator whereby discharge of said second capacitor is operative to apply a forward biasing pulse for triggering said multivibrator into oscillation.

11. A power supply according to claim 10 wherein said voltage detection means comprises a relaxation oscillator operative to generate threshold signal pulses for the duration of said predetermined level of charge on said first capacitor, and means for coupling said threshold signal pulses as a control signal to said gate-controlled switch for discharging said third capacitor, discharge of said third capacitor causing any charge on said second capacitor to be drained through said diode clamping means.

12. A power supply according to claim 11 further including a current-sensing resistor connected in circuit with said first capacitor and said gate-controlled switch for applying a control signal to trigger said gate-controlled switch in response to discharge of said first capacitor, said triggered switch discharging said third capacitor and thereby causing any charge on said second capacitor to be drained through said diode clamping means, and wherein the RC charge circuit of said second discharge means has a time constant sufficient to delay starting of said multivibrator beyond the deionization period of said flashlamp.